United States Patent
Probin et al.

(10) Patent No.: US 9,985,824 B2
(45) Date of Patent: *May 29, 2018

(54) SYSTEMS AND METHODS FOR INCREASING ROBUSTNESS OF A SYSTEM WITH A REMOTE SERVER

(71) Applicant: Honeywell International Inc., Morristown, NJ (US)

(72) Inventors: Robert John Probin, Glasgow (GB); Gavin Fraser Davidson, Madrid (ES); Martin Leonard Crisp, Motherell (GB)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/078,623

(22) Filed: Mar. 23, 2016

(65) Prior Publication Data
US 2016/0226702 A1  Aug. 4, 2016

Related U.S. Application Data

(63) Continuation of application No. 13/795,823, filed on Mar. 12, 2013, now Pat. No. 9,311,173.

(51) Int. Cl.
*G06F 11/20* (2006.01)
*H04L 12/24* (2006.01)
(Continued)

(52) U.S. Cl.
CPC ...... *H04L 41/0659* (2013.01); *G06F 11/0751* (2013.01); *G06F 11/2007* (2013.01);
(Continued)

(58) Field of Classification Search
None
See application file for complete search history.

(56) References Cited

U.S. PATENT DOCUMENTS 5,758,324 A * 5/1998 Hartman ........... G06F 17/30011
705/1.1
7,873,868 B1 * 1/2011 Heideman ............... G06F 9/466
711/113
(Continued)

FOREIGN PATENT DOCUMENTS

CN 1501043 A 6/2004
CN 1612542 A 5/2005
(Continued)

OTHER PUBLICATIONS

Honeywell Intrusion and Communications—AlarmNet Services, http://www.security.honeywell.com/hsc/solutions/ alarmnet/index.html © 2004-2013.
(Continued)

*Primary Examiner* — Yolanda L Wilson
(74) *Attorney, Agent, or Firm* — Husch Blackwell LLP (57) ABSTRACT

Systems and methods for increasing robustness of a system with a remote server are provided. Some methods can include a first system remotely controlling a second system, detecting a failure in the first system or in a communication link between the first system and the second system, and temporarily removing control of the second system from the first system.

17 Claims, 8 Drawing Sheets

(51) Int. Cl.
*G08B 25/00* (2006.01)
*G08B 29/16* (2006.01)
*G06F 11/07* (2006.01)
*G08B 25/01* (2006.01)
*G08B 25/10* (2006.01)
*H04L 12/26* (2006.01)

(52) U.S. Cl.
CPC ......... *G08B 25/004* (2013.01); *G08B 25/014* (2013.01); *G08B 25/10* (2013.01); *G08B 29/16* (2013.01); *H04L 43/0817* (2013.01)

(56) References Cited

U.S. PATENT DOCUMENTS

| | | | |
|---|---|---|---|
| 8,179,256 B2 | 5/2012 | Crisp et al. | |
| 2005/0207105 A1 | 9/2005 | Davies | |
| 2008/0184059 A1 | 7/2008 | Chen | |
| 2008/0204190 A1 | 8/2008 | Cohn et al. | |
| 2009/0240974 A1 | 9/2009 | Baba et al. | |
| 2009/0322527 A1 | 12/2009 | Crisp et al. | |
| 2010/0045471 A1 | 2/2010 | Meyers | |
| 2010/0313064 A1 | 12/2010 | Boctor et al. | |
| 2011/0046698 A1 | 2/2011 | Kivi et al. | |
| 2011/0047253 A1* | 2/2011 | Bhat | H04L 41/04 709/221 |
| 2011/0261680 A1* | 10/2011 | Boudreaux | H04W 24/04 370/217 |
| 2012/0154138 A1* | 6/2012 | Cohn | G08B 25/004 340/501 |
| 2013/0179625 A1* | 7/2013 | Stanton | G08B 29/16 711/103 |
| 2013/0285799 A1* | 10/2013 | Probin | G05B 15/02 340/12.22 |

FOREIGN PATENT DOCUMENTS

| | | |
|---|---|---|
| CN | 101446965 A | 6/2009 |
| EP | 2 124 206 A1 | 11/2009 |
| JP | 2011 28574 A | 2/2011 |

OTHER PUBLICATIONS

Honeywell Security and Communications—UK—C081 DCM, http://www.security.honeywell.comluk/intruder/products/co/gxacc/ac/213273.html © 2004-2013.

Honeywell Intrusion and Communications—iGSMV, http://www.security.honeywell.com/hsc/products/alarm/re/gsm/304824.html © 2004-2013.

Honeywell Intrusion and Communications—7845GSM, http://www.security.honeywell.com/canada/products/alann/re/gsm/103665.html © 2004-2013.

Honeywell Galaxy® Dimension, Integrated Intrusion and door control panel range © 2012.

European Search Report, dated Feb. 11, 2015, corresponding to Application No. EP 14 15 7514.

English lanuage translation of abstract of JP,2011-028574,A.

Anonymous: "How Terminal Services Works," Technet.microsoft. com, Mar. 28, 2003, pp. 1-9, XP-002730530, http://technet.microsoft.com/en-us/library/cc755399(d=printer,v=ws.10).aspx.

First Office Action and Search Report for corresponding CN patent application 201410089223.x, dated Dec. 20, 2016.

English-language translation of First Office Action and Search Report for corresponding CN patent application 201410089223,x, dated Dec. 20, 2016.

English-language translation of Abstract for CN 1501043 A, dated Jun. 2, 2004.

English-language translation of Abstract for CN 1612542 A, dated May 4, 2005.

English-language translation of Abstract for CN 101446965 A, dated Jun. 3, 2009.

* cited by examiner

SYSTEMS AND METHODS FOR INCREASING ROBUSTNESS OF A SYSTEM WITH A REMOTE SERVER

CROSS-REFERENCE TO RELATED APPLICATIONS

This application is a continuation of and claims the benefit of the filing date of U.S. application Ser. No. 13/795,823 filed Mar. 12, 2013.

FIELD

The present invention relates generally to a system with a remote server. More particularly, the present invention relates to systems and methods for increasing robustness of a system with a remote server.

BACKGROUND

Intruder alarm security systems are known in the art. For example, U.S. Pat. No. 8,179,256, U.S. Publication No. 2009/0322527, and EP 2124206 describe a server based distributed security system. Each of U.S. Pat. No. 8,179,256, U.S. Publication No. 2009/0322527, and EP 2124206 is owned by the assignee hereof and is hereby incorporated by reference.

U.S. application Ser. No. 13/456,788 describes a system and method to protect against local control failure using cloud-hosted control system back-up processing, and U.S. application Ser. No. 13/348,187 describes security system storage of persistent data. Each of U.S. application Ser. No. 13/456,788 and U.S. application Ser. No. 13/348,187 is assigned to the assignee hereof and is hereby incorporated by reference.

In each of the systems described in U.S. Pat. No. 8,179,256, U.S. Publication No. 2009/0322527, EP 2124206, U.S. application Ser. No. 13/456,788, and U.S. application Ser. No. 13/348,187, problems can arise if a link or network between a system under control and a remote control system becomes unavailable or reduced to the extent that a required bandwidth or latency is insufficient.

In view of the above, there is a continuing, ongoing need for systems and methods for increasing robustness of a system with a remote server.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods for increasing robustness of a system with a remote server. For example, a first system can be controlled by a remote second system.

Figure 1:
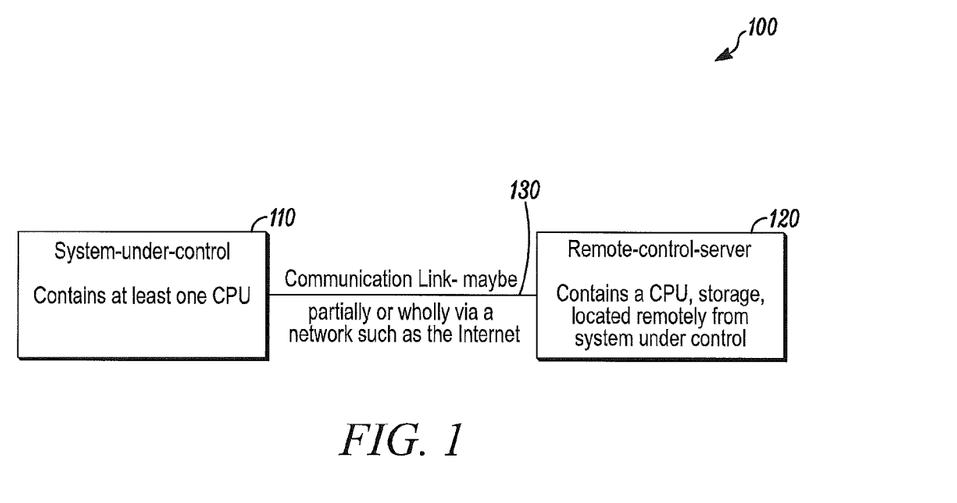
FIG. 1 is a block diagram of a system in accordance with disclosed embodiments.

FIG. 1 is a block diagram of a system 100 in accordance with disclosed embodiments. As seen in FIG. 1, the system 100 can include a first system 110 or a system under control and a second system 120 or a remote control system. The system under control 110 can include at least one CPU, and the remote control system 120 can include at least one CPU and a storage device. The remote control system 120 can be remotely located from the system under control 110 and be connected via a communication link 130, such as a network like the Internet.

In some embodiments, the system under control 110 can include an automated control system, such as an intrusion or access system, and in some embodiments, the remote control system 120 can include a remote control server, a personal computer, a server farm, or a cloud computing network. In some embodiments, the system under control 110 can be entirely or partially controlled by the remote control system 120. In some embodiments, the remote control system 120 can provide and entirely or partially implement control logic or intelligence of the system under control 110.

Embodiments disclosed herein can include solutions that can be implemented individually or in combination to alleviate the effects of a problem between the link 130 connecting the system under control 110 and the remote control system 120. For example, embodiments of the solutions disclosed herein can be implemented when the link 130 between the system under control 110 and the remote control system 120 becomes unavailable or reduced to the extent that a required bandwidth or latency is insufficient.

Solutions that can be implemented individually or in combination in accordance with embodiments disclosed herein can include the following: moving pieces of relocatable code, including a security fallback mode in a control panel, including fallback modes in peripheral devices, detecting failure and providing notification, caching data until a reconnection is established, including a communication gateway device or a system dialing device, reducing impact from a lower bandwidth subsection via differential data exchange or HTML language, providing an alternate communication path, providing a duplicate mirror server, providing a server cluster for redundancy, guaranteeing a reliable communication link, providing physical security, providing full redundancy in an add-on module, predicting faults in communication links, optimizing communication links, and providing refinements to communication links. Each of these solutions will be described in detail herein.

Some embodiments disclosed herein can include the system under control and the remote control system executing the same logic. For example, in some embodiments, the system under control can execute all or a subset of the logic that the remote control system can execute so that security is not compromised.

To ensure that the system under control and the remote control system can execute the same logic, at least some pieces of the control logic can be moved and executed to keep the system under control in synchronization with the remote control system. That is, systems and methods disclosed herein can move code, as necessary, can execute the code on the remote control system, and can execute the code and/or copies of the code on the system under control in order to create a redundant system.

For example, in some embodiments, executable control software code can be written in native binary object machine language compiled from high level code. However, this solution can be hindered by the need to compile in different architectures, for example, if the architecture of the system under control's CPU is different than the remote control system's CPU.

In some embodiments, executable control software code can be written in a programming language in which complied code is decoupled from system architecture, for example, Java. This solution can eliminate portability issues and offer the possibility of writing the code once while running the code anywhere. However, this solution requires that the system under control includes extra processing power and memory, which equate to additional cost.

In some embodiments, executable control software code can be written in an interpreted language, such as Lua or Python. In these embodiments, the code can be located on the system under control's CPU and on the remote control system's CPU without the need for a compiler. That is, this solution requires no additional steps, such as compiling locally, to execute the code on both a high end remote control server and a lower end microcontroller of the system under control. Advantageously, the code can be moveable without the need to consider architecture, portability, or a compiler. Accordingly, this solution can be easily incorporated into a modular decoupled system in which software components can be upgraded independently without the need to copy all of the control logic from the remote control system to the system under control.

Figure 2:
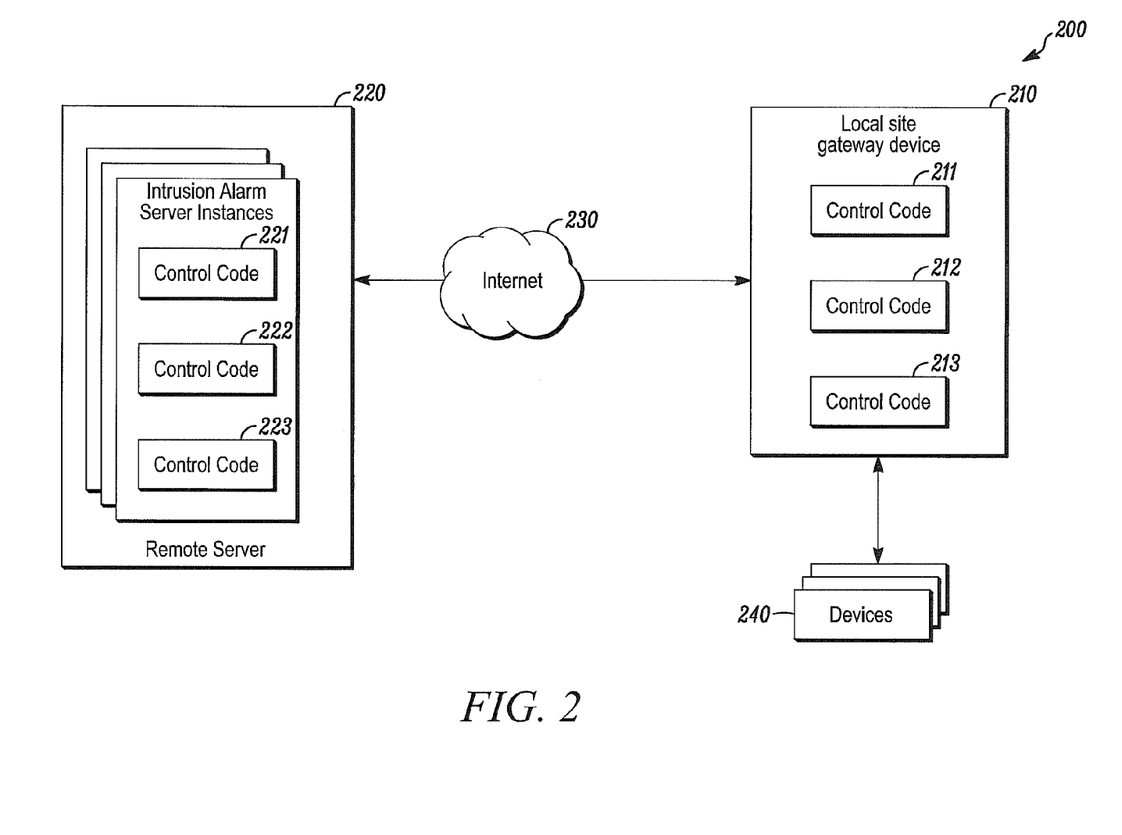
FIG. 2 is a block diagram of a system illustrating movement of pieces of relocatable code in accordance with disclosed embodiments.

FIG. 2 is a block diagram of a system 200 illustrating the movement of pieces of relocatable code in accordance with disclosed embodiments. As seen in FIG. 2, the system 200 can include a remote control system 220 connected to a system under control 210 via a communication medium 230. For example, the communication medium 230 can include the Internet, a WAN, or any other long distance communication technology as would be known by those of skill in the art.

In some embodiments, the remote control system 220 can include, but is not limited to a server, a personal computer, a server machine, a cloud computing network, a computing cluster, a grid computer, or any other remote computational device as would be known by those of skill in the art. The remote control system 220 shown in FIG. 2 can include one or more intrusion alarm servers, but a server in accordance with disclosed embodiments can also include an access control server or any other control system server as would be known by those of skill in the art.

The system under control 210 can include a central or local gateway and/or a communications device connected to a plurality of other devices 240, such as sensors. However, it is to be understood that embodiments disclosed herein are not so limited. For example, any or all of the devices 240 can individually communicate directly with the remote control system 220 and execute actions otherwise executed by the gateway device.

In normal operation, the remote control system 220 can control and retrieve data from the system under control 210 via the communication medium 230. The system under control 210 can, in turn, communicate with at least some of the plurality of devices 240 to retrieve data, update outputs and/or status, and/or change a mode of operation of the devices 240. Control processing and decision making for the system under control 210 can be performed by the remote control system 220. For example, processing executed by the remote control system 220 can cause changes in or to the devices 240.

As seen in FIG. 2, the remote control system 220 can ensure that at least some of its control code 221, 222, 223, for example, critical control code, is copied to the system under control 210. That is, copies of the control code 211, 212, 213 can be stored on the system under control 210. When changes or updates are made to the control code 221, 222, 223 on the remote control system 220, the remote control system 220 can also make corresponding changes or updates in the copies 211, 212, 213 on the system under control 210.

In accordance with disclosed embodiments, when a failure in the communication medium 230 occurs, the system under control 210 can detect the failure, for example, by detecting a lack of communication from the remote control system 220 for a predetermined period of time. Upon detecting the failure in the communication medium 230, the system under control 210 can switch from being controlled by the remote control system 220 to using the local copies of the control code 211, 212, 213 until the communication path 230 is restored. That is, the system under control 210 can switch to being controlled by the local copies of the control code 211, 212, 213.

Although not shown in FIG. 2, the remote control system 220 can communicate with external systems for alarm reporting and notification of persons, individual system configuration, and user access. However, when the failure in the communication medium 230 occurs, the system under control 210 can communicate with the external systems for the alarm reporting and notification. Additionally or alternatively, data related to communicating with the external systems for the alarm reporting and notification can be stored until communication with the remote control system 220 is restored.

Some embodiments disclosed herein can provide local fallback logic in the system under control. For example, in a fallback mode, the system under control can execute basic security needs autonomously without synchronizing complex control logic, site configuration, and/or runtime data with the remote control system. In some embodiments, executing basic security needs can include transmitting a message to a second system indicating that connection systems have failed and/or that the system under control is offline. In some embodiments, executing basic security needs can include implementing critical features, such as sounding a local alarm or transmitting an alarm report directly to an alarm reporting center.

In some embodiments, peripheral devices included in the system under control can include their own fallback mode and/or local fallback logic, for example, if a main CPU of the system under control has a fault that prevents operation.

For example, a peripheral device, such as door control module, can include autonomous functionality to enable access to a reduced set of users when a main system is offline.

Some embodiments disclosed herein can include the remote control system indicating that the system under control has lost connection with the remote control system. For example, substantially immediately or within seconds of a lost connection, the remote control system can provide an indication of the lost connection and/or an alarm to an operator who can be locally and/or remotely located to the remote control system. The operator can notify predetermined persons, such as an owner, a security guard, a system installation company, or a maintenance company, to take appropriate actions. Additionally or alternatively, the remote control system or a delegated system thereof can provide a notification to the predetermined persons directly and without the need for the operator. For example, the remote control system can transmit an indication of the lost connection and/or the alarm via an appropriate transmission method, such as a telephone call with synthesized voice, a text message via a cellular mobile telephone network, or a digital data message to a specialized piece of equipment.

Some embodiments disclosed herein can include caching or storing data from inputs at the system under control until a connection with the remote control system can be reestablished. For example, in some embodiments, the data can be cached or stored local to the system under control.

Some embodiments disclosed herein can include a secondary device that, under certain circumstances, can take over part of the remote control system's functions. For example, some embodiments disclosed herein can include a system dialing device and/or a communication gateway device that can trigger and activate an alarm and/or store and log events when communication is lost and an intruder event occurs. In some embodiments, the system dialing device and/or the communication gateway device can identify system modes and process data according to type and origin. For example, in some embodiments, the system dialing device and/or the communication gateway device can trigger and/or activate an internal alarm when a first device is activated, but trigger and/or activate an external alarm when a second device is activated.

In some embodiments, the system dialing device and/or the communication gateway device can include and/or perform functionality of the remote control system. In some embodiments, the system dialing device and/or the communication gateway can include an internal processing unit that can store a copy of configuration and/or processing logic that can be enabled during a network system error. However, it is to be understood that embodiments disclosed herein are not so limited. For example, any device in the systems disclosed herein can include the internal processing unit that can store the copy of the configuration and/or processing logic that can be enabled during the network system error.

Some embodiments disclosed herein can reduce the susceptibility of the system under control to issues related to bandwidth and sporadic network unavailability. For example, some embodiments can include a differential data exchange between the system under control and the remote control system. That is, in some embodiments, the system under control can only transmit changes in a state of data to the remote control system. This solution can significantly reduce a load on a high end remote control system when there are a large number of modules connected to the system under control.

Figure 5:
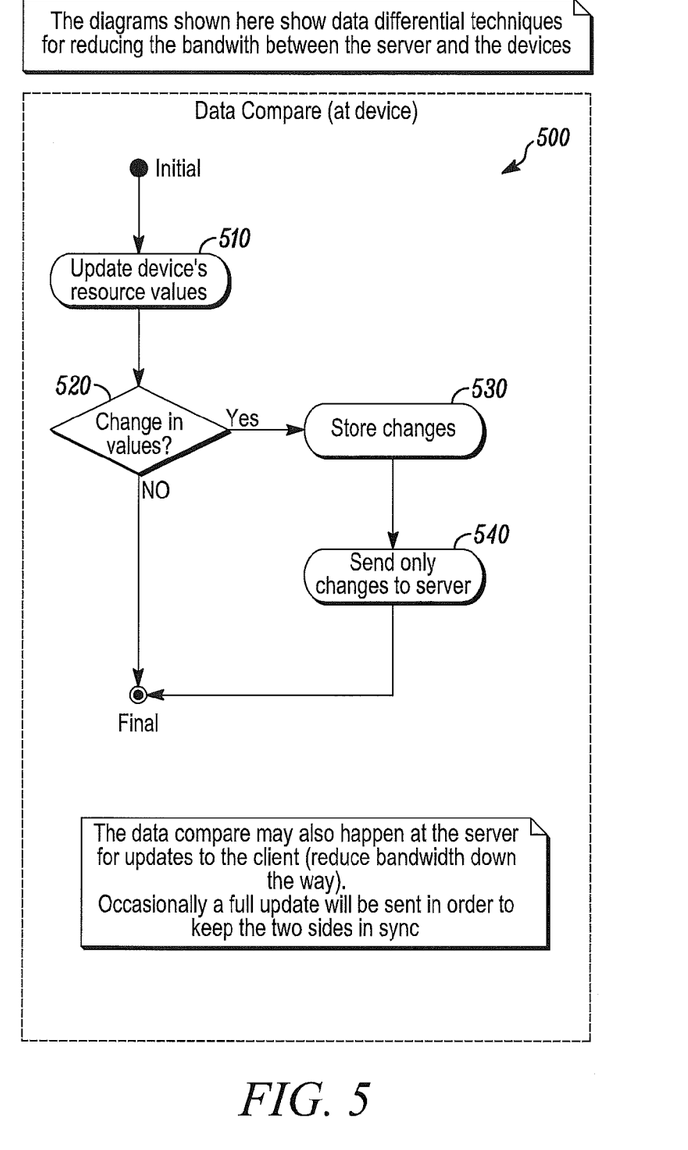
FIG. 5 is a flow diagram of a method of differential data exchange in accordance with disclosed embodiments.
Figure 6:
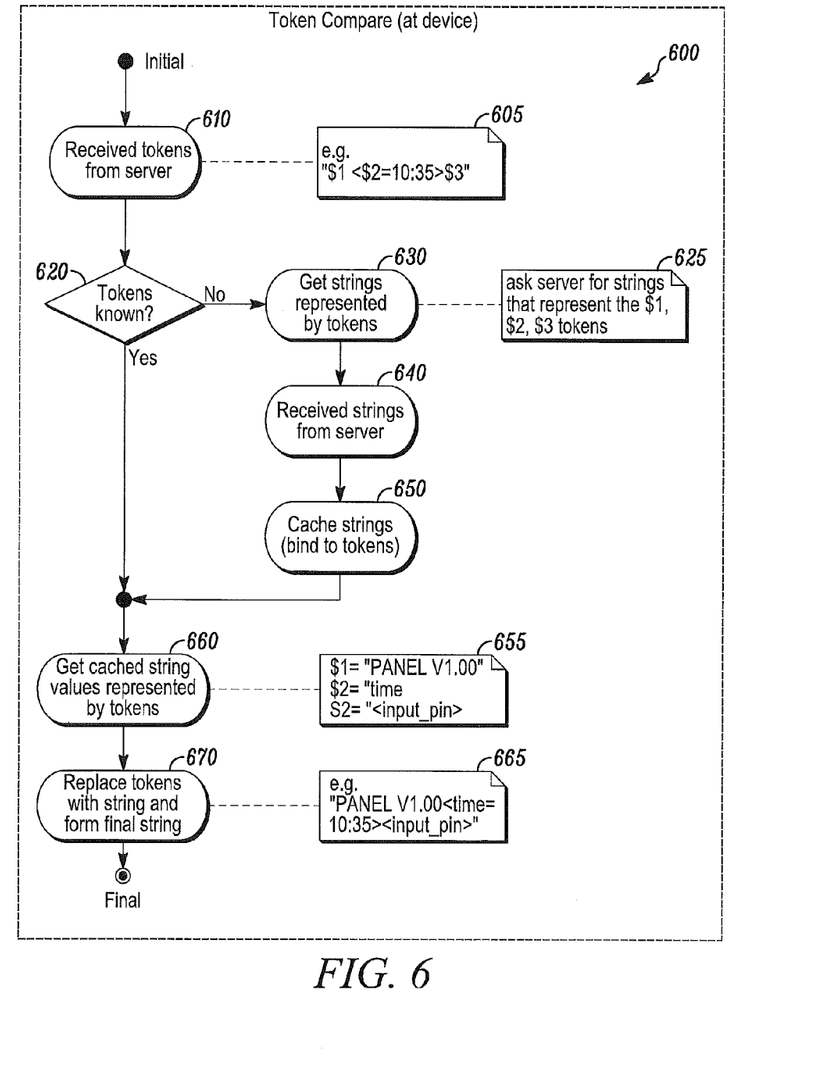
FIG. 6 is a flow diagram of a method of differential data exchange in accordance with disclosed embodiments.

FIG. 5 and FIG. 6 are flow diagrams of methods 500 and 600, respectively, of a differential data exchange in accordance with disclosed embodiments. When executed, the methods 500 and 600 can reduce a required bandwidth for data transmission between the system under control and the remote control system.

As seen in FIG. 5, the method 500 can include updating at least one resource value in a device of the system under control as in 510. Then, the method 500 can include determining whether the updated resource value included a change as compared to previously stored values as in 520. If not, then the method 500 can terminate. However, if the method 500 determines that the updated resource value includes a change as compared to previously stored values as in 520, then the method can include storing the changes as in 530 and transmitting only the stored changes to the remote control system as in 540.

It is to be understood that the data comparison in the method 500 can also occur at the remote control system to reduce the required bandwidth for data transmission from the remote control system to the system under control. For example, client updates can be updated in the remote control system, and methods in accordance with disclosed embodiments can determine whether the updated client updates included a change as compared to previously stored client updates. If so, then the changes can be stored and only the stored changes can be transmitted to the system under control. In some embodiments, a full update can periodically be sent from the remote control system to the system under control and/or from the system under control to the remote control system to keep the systems in synchronization.

As seen in FIG. 6, the method 600 can include the system under control receiving tokens 605 as in 610. Then, the method 600 can include determining whether the received tokens are known as in 620. If not, then the method 600 can include transmitting a request for strings 625 represented by the tokens as in 630, receiving the strings from the remote control system as in 640, and caching the received strings as in 650. For example, caching the received strings as in 650 can include binding the strings received as in 640 to the tokens received as in 610.

After the method 600 determines that the received tokens are known as in 620 or after the method 600 caches the received strings as in 650, the method 600 can include retrieving cached string values 655 represented by the tokens as in 660. Then, the method 600 can include replacing the tokens with strings to form a final string 665 as in 670.

In addition or as an alternative to the differential data exchange, some embodiments can include a user interface caching at the system under control to give the system under control a certain level of local intelligence to execute subsets of the user interface. For example, the user interface can cache at the system under control in the form of an HTML language or the like. This solution can reduce the need to transmit every key press and display from the system under control to the remote control system, thereby improving performance and the user interface experience.

Figure 7:
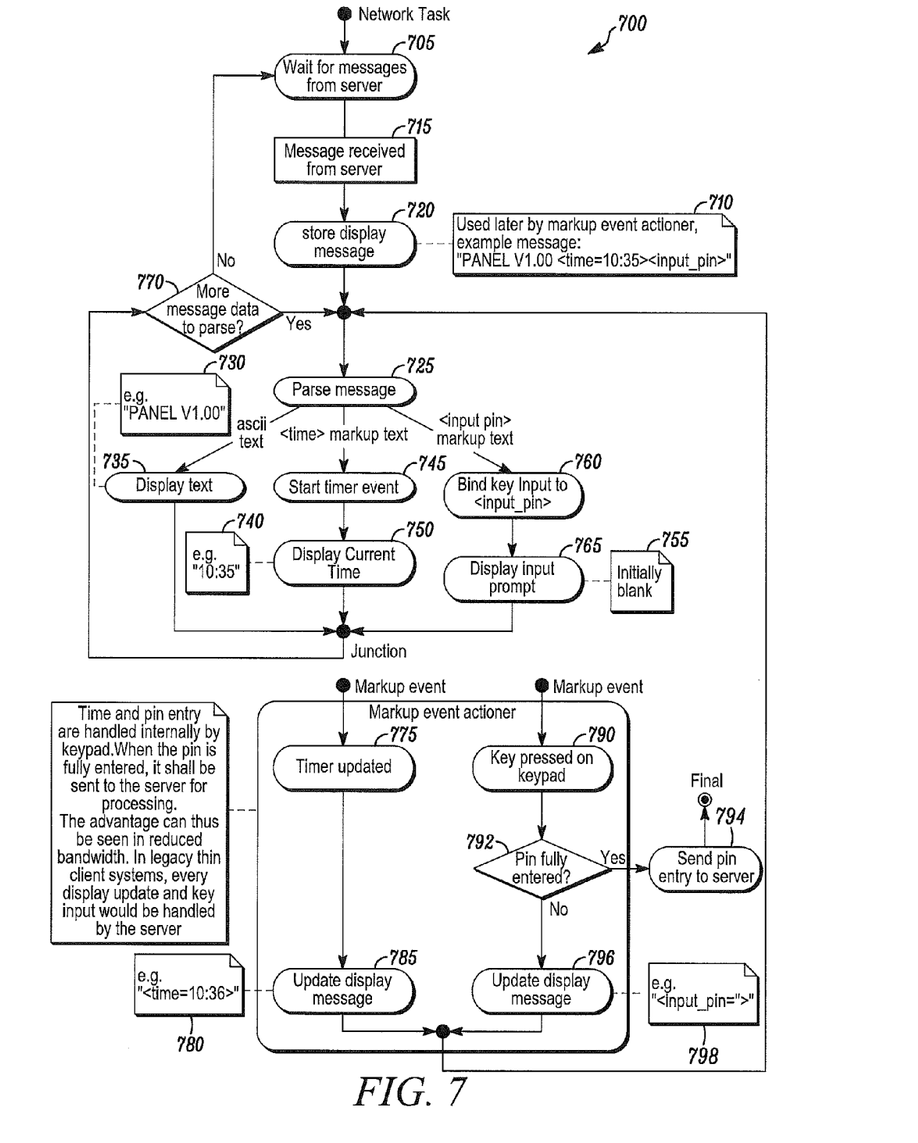
FIG. 7 is a flow diagram of a method of a user interface caching at a system under control in accordance with disclosed embodiments.

FIG. 7 is a flow diagram of a method 700 of a user interface caching at the system under control in accordance with disclosed embodiments. As seen in FIG. 7, the method 700 can include waiting for display messages from the remote control system as in 705. Then, the method 700 can include receiving a display message 710 from the remote control system as in 715 and storing the display message 710 as in 720.

After the method 700 stores the display message 710 as in 720, the method 700 can include parsing the message 710 as in 725. For example, the method 700 can parse ASCII text 730 from the stored display message 710 and display the ASCII text 730 as in 735. Similarly, the method 700 can parse time markup text 740 from the stored display message 710, start a timer event as in 745, and display the time markup text 740 as in 750. The method 700 can also parse input pin markup text 755 from the stored display message 710, bind received key input to the input pin markup text 755 as in 760, and display an input prompt as in 765.

After parsing the ASCII text 730, the time markup text 740, and the input pin markup text 755, the method 700 can include determining whether there is more message data to parse as in 770. If yes, then the method 700 can continue parsing as in 725. However, if the method 700 determines that there is no more message data to parse as in 770, then the method can continue waiting for messages from the remote control system as in 705.

In accordance with disclosed embodiments, time display updates and pin entry can be handled internally by a user interface of the system under control, for example, a keypad. For example, in some embodiments, a pin can be sent to the remote control system for processing only after the pin is fully entered. Advantageously, such embodiments can reduce bandwidth as compared to systems and methods known in the art in which every display update and key input are transmitted to the remote control system.

As seen in FIG. 7, when a markup event occurs, the method 700 can include updating a timer as in 775 and receiving data related to a key pressed on the keypad as in 790. For example, after the timer is updated as in 775, the method 700 can include updating a display message 780 as in 785.

After the data related to the key pressed on the keypad is received as in 790, the method can include determining whether the pin is fully entered as in 792. If yes, then the method 700 can transmit the entered pin to the remote control system as in 794. However, if the method determines that the pin is not fully entered as in 792, then the method 700 can include updating a display message 798 as in 796.

After the method 700 updates the display message 780 as in 785 and/or after the method 700 updates the display message 798 as in 796, the method 700 can continue parsing as in 725.

Some embodiments disclosed herein can include a backup communication path that is provided locally to the system under control. For example, when the system under control detects a network problem, the system under control can automatically switch to using an alternate, local, outgoing communication path. In some embodiments, a primary communication path can include an Ethernet path with broadband connection for connecting to the Internet, and the backup communication path can include a cellular mobile network modem (e.g., GPRS, 3G, 4G, etc.) for connecting to the Internet. However, in any embodiment, the system under control can include more than one backup communication path, and the system under control can attempt using each backup communication path until a link to the remote control system is reestablished.

Figure 3:
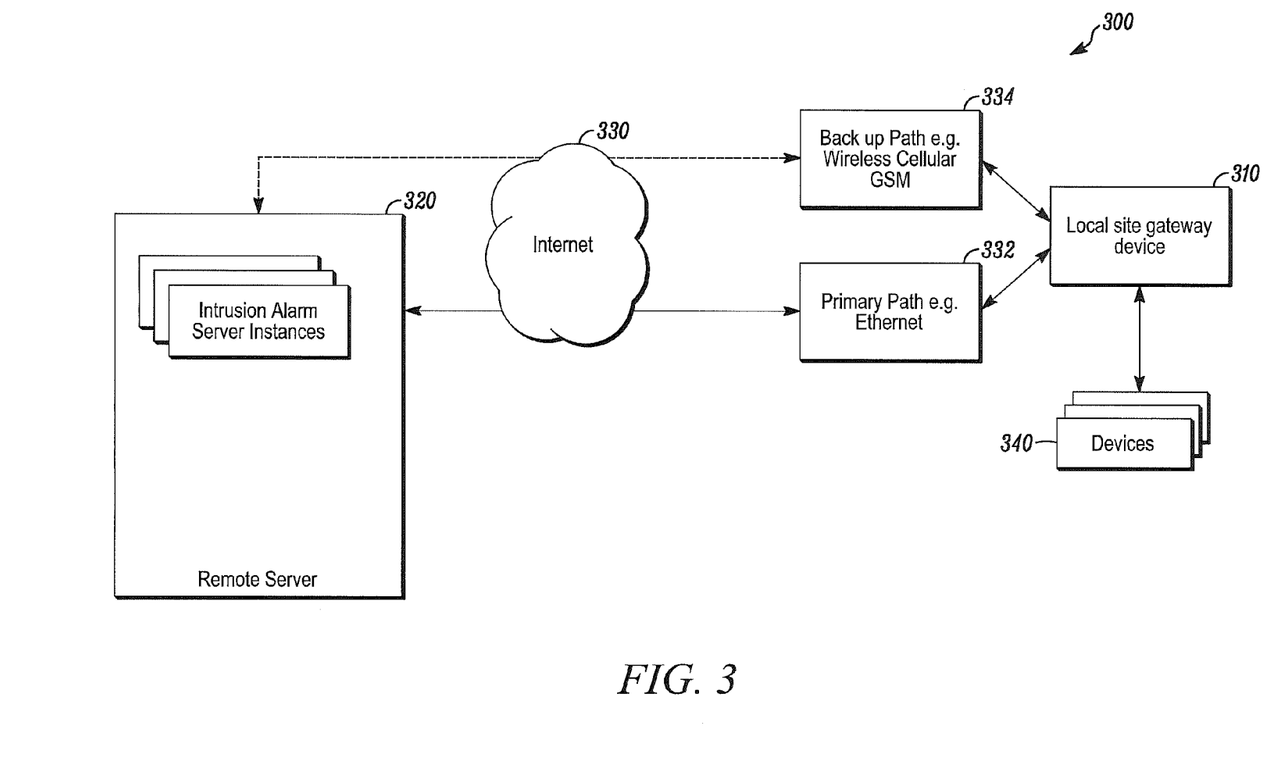
FIG. 3 is a block diagram of a system illustrating an alternate communication path in accordance with disclosed embodiments.

FIG. 3 is a block diagram of a system 300 illustrating an alternate communication path in accordance with disclosed embodiments. As seen in FIG. 3, the system 300 can include a remote control system 320 connected to a system under control 310 via a communication medium 330. For example, the communication medium 330 can include the Internet, a WAN, or any other long distance communication technology as would be known by those of skill in the art.

In some embodiments, the remote control system 320 can include, but is not limited to a server, a personal computer, a server machine, a cloud computing network, a computing cluster, a grid computer, or any other remote computational device as would be known by those of skill in the art. The remote control system 320 shown in FIG. 3 can include one or more intrusion alarm servers, but a server in accordance with disclosed embodiments can also include an access control server or any other control system server as would be known by those of skill in the art.

The system under control 310 can include a central or local gateway and/or a communications device connected to a plurality of other devices 340, such as sensors. However, it is to be understood that embodiments disclosed herein are not so limited. For example, any or all of the devices 340 can individually communicate directly with the remote control system 320 and execute actions otherwise executed by the gateway device.

As seen in FIG. 3, the system 300 can also include a primary communication path 332 and a backup communication path 334. For example, the primary communication 332 path can be implemented, in part, with a primary communication device, and the backup communication path 334 can be implemented, in part, with a backup communication device.

In some embodiments, the technology supporting the primary communication path 332 can be different than and/or dissimilar from the technology supporting the backup communication path 334 so that one failure does not prevent communications via both the primary communication path 332 and the backup communication path 334. For example, in some embodiments, the primary communication path 332 can include a wired technology, such as the Ethernet, and in some embodiments, the backup communication path can include a wireless technology, such as a cellular GSM network. The system under control 310 can access the communication medium 330 via one or both of the primary communication path 332 and the backup communication path 334.

In normal operation, the remote control system 320 can control and retrieve data from the system under control 310 via the primary communication path 332 and the communication medium 330. The system under control 310 can, in turn, communicate with at least some of the plurality of devices 340 to retrieve data, update outputs and/or status, and/or change a mode of operation of the devices 340. Control processing and decision making for the system under control 310 can be performed by the remote control system 320. For example, processing executed by the remote control system 320 can cause changes in or to the devices 340.

In accordance with disclosed embodiments, when a failure in the primary communication path 332 occurs, the system under control 310 can detect the failure, for example, by detecting a lack of communication from the remote control system 320 for a predetermined period of time. Upon detecting the failure in the primary communication path 332, the system under control 310 can switch from using the primary communication path 332 to using the backup communication path 334. That is, the system under control 310 can begin communicating with the remote control system 320 via the backup communication path 334 and the communication medium 330.

Although not shown in FIG. 3, the remote control system 320 can communicate with external systems for alarm reporting and notification of persons, individual system configuration, and user access.

Some embodiments disclosed herein can include a second, redundant, backup or mirror remote control system that can perform remote control system logic with a duplicate version of a first remote control system's site configuration and business logic. For example, when the system under control detects a network problem, the system under control can automatically switch to the backup remote control system. In some embodiments, the first remote control system and the backup remote control system can be located at different physical locations and include different destination addresses, for example, Internet IP addresses.

Figure 4:
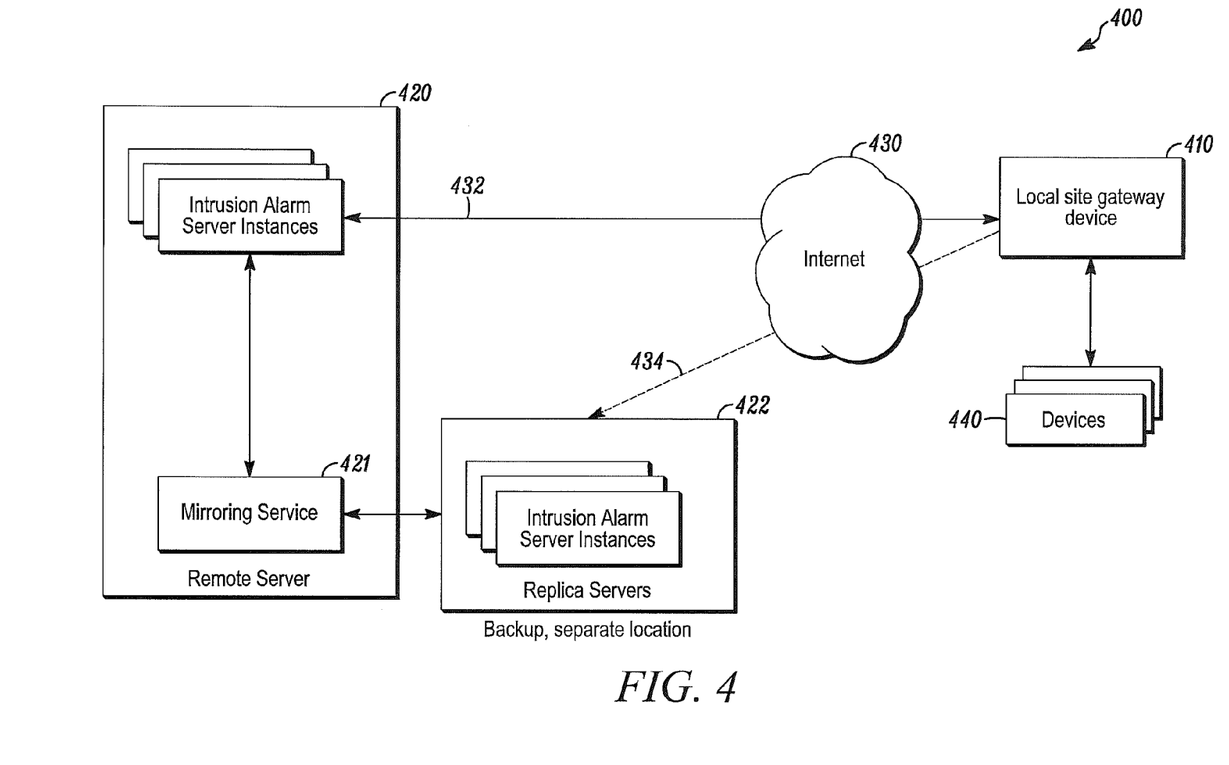
FIG. 4 is a block diagram of a system illustrating a backup remote control server in accordance with disclosed embodiments.

FIG. 4 is a block diagram of a system 400 illustrating a backup remote control server in accordance with disclosed embodiments. As seen in FIG. 4, the system 400 can include a remote control system 420 connected to a system under control 410 via a communication medium 430 and a communication path 432. For example, the communication medium 430 can include the Internet, a WAN, or any other long distance communication technology as would be known by those of skill in the art.

In some embodiments, the remote control system 420 can include, but is not limited to a server, a personal computer, a server machine, a cloud computing network, a computing cluster, a grid computer, or any other remote computational device as would be known by those of skill in the art. The remote control system 420 shown in FIG. 4 can include one or more intrusion alarm servers, but a server in accordance with disclosed embodiments can also include an access control server or any other control system server as would be known by those of skill in the art.

The system under control 410 can include a central or local gateway and/or a communications device connected to a plurality of other devices 440, such as sensors. However, it is to be understood that embodiments disclosed herein are not so limited. For example, any or all of the devices 440 can individually communicate directly with the remote control system 420 and execute actions otherwise executed by the gateway device.

In normal operation, the remote control system 420 can control and retrieve data from the system under control 410 via the communication medium 430 and the communication path 432. The system under control 410 can, in turn, communicate with at least some of the plurality of devices 440 to retrieve data, update outputs and/or status, and/or change a mode of operation of the devices 440. Control processing and decision making for the system under control 410 can be performed by the remote control system 420. For example, processing executed by the remote control system 420 can cause changes in or to the devices 440.

As seen in FIG. 4, the system 400 can also include a mirror, replica, or backup remote control system 422 located in a location that is physically separate from a location of the remote control system 420. The backup remote control system 422 can be connected to the system under control 410 via the communication medium 430 and a communication path 434. In some embodiments, the backup remote control system 422 can include, but is not limited to a server, a personal computer, a server machine, a cloud computing network, a computing cluster, a grid computer, or any other remote computational device as would be known by those of skill in the art. The backup remote control system 422 shown in FIG. 4 can include one or more intrusion alarm servers, but a server in accordance with disclosed embodiments can also include an access control server or any other control system server as would be known by those of skill in the art.

In accordance with disclosed embodiments, when a failure in the remote control system 420 or the communication path 432 to the remote control system 420 occurs, the system under control 410 can detect the failure, for example, by detecting a lack of communication from the remote control system 420 for a predetermined period of time. Upon detecting the failure, the system under control 410 can switch from being controlled by the remote control system 420 to being controlled by the backup remote control system 422. That is, the system under control 410 can switch from communicating with the remote control system 420 via the communication path 432 to communicating with the backup remote control system 422 via the communication path 434.

Data stored in the remote control system 420 can be automatically replicated and/or copied on the backup remote control system 422 on an ongoing basis. For example, the remote control system 420 can include a monitoring system 421 or execute a monitoring process on an ongoing basis to ensure that the backup remote control system 422 includes current and up-to-date information in the case of remote control system 420 failure.

Although not shown in FIG. 4, each of the remote control system 420 and the backup remote control system 422 can communicate with external systems for alarm reporting and notification of persons, individual system configuration, and user access.

Some embodiments disclosed herein can provide redundancy through a set of remote control systems that effectively operate under a single destination address. Switching between each of the set of remote control systems can be performed via a router server and/or automatically to a secondary remote control system when a fault is detected in the operation of a primary remote control system.

Some embodiments disclosed herein can include a communication link that has a guaranteed reliable uptime, and some embodiments disclosed herein can include additional physical security on a physical communication link between the system under control and the remote control system. For example, in some embodiments, the physical communication link can include a steel-armored fiber optic cable.

Some embodiments disclosed herein can include a system add-on module that can be available in multiple versions depending on the size of the system under control with which the add-on module is to be used. For example, the largest version of the add-on module can include the capability to run the entire system under control, whereby full redundancy can be available for a local or remote network failure.

Some embodiments disclosed herein can store and analyze data related to the stability of a communication path over a period of time. Based on the data and the analysis thereof, some systems and methods disclosed herein can provide a notification to an end user. For example, systems and methods can provide the notification to the end user when a currently installed fallback mode should be enabled. Systems and methods can also provide the notification to the end user with information on tracing faults in the communication path.

In some embodiments, when maintenance is planned on one or more communication paths, systems and methods disclosed herein can modify a level of a fallback mode, for example, when one of the communication channels fails. For example, if a specified communication path fails during a predetermined period of time, then systems and methods can access the fallback mode so that systems and methods continue functioning.

In some embodiments, an alarm can be activated when a communication link between the system under control and the remote control system fails.

Figure 8:
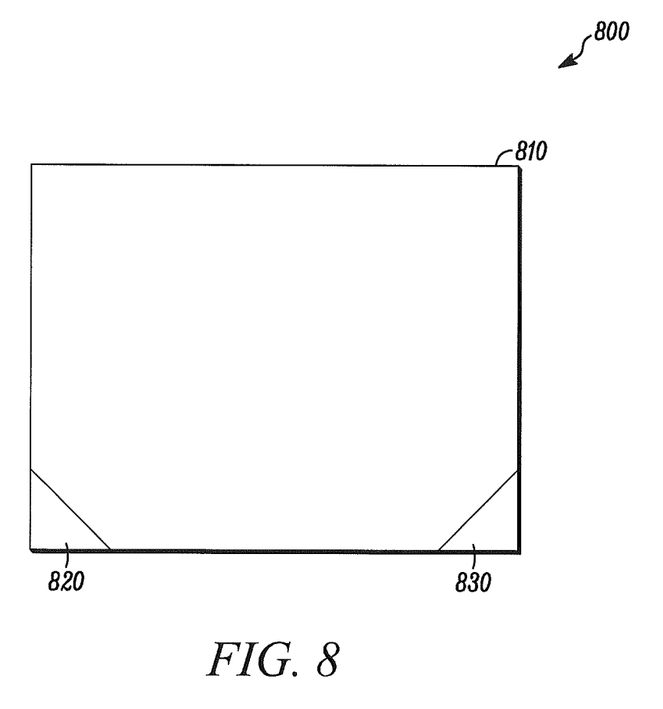
FIG. 8 is a block diagram of a system for executing the methods of FIG. 5, FIG. 6, FIG. 7, and others in accordance with disclosed embodiments.

Some or all of the methods disclosed herein can be executed with the system 800 shown in FIG. 8. Similarly, some or all of the systems disclosed herein can be implemented with the system 800 shown in FIG. 8. For example, the system 800 can include control circuitry 810, one or more programmable processors 820, and executable control software stored on a transitory or non-transitory computer readable medium, including but not limited to computer memory, RAM, optical storage media, magnetic storage media, flash memory, and the like. In some embodiments, the executable control software 830 can implement the methods disclosed herein.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A method comprising:
    a remote server remotely controlling a local gateway device by the remote server executing control logic of the local gateway device stored on the remote server;
    the local gateway device managing data and settings for a plurality of devices coupled to the local gateway device in response to the remote server executing the control logic;
    the local gateway device detecting a failure in the remote server or in a communication link between the remote server and the local gateway device; and
    the local gateway device temporarily removing control of the local gateway device from the remote server.

2. The method of claim 1 wherein detecting the failure in the remote server or in the communication between the remote server and the local gateway device includes detecting a lack of communication from the remote server for a predetermined period of time.

3. The method of claim 1 wherein temporarily removing the control of the local gateway device from the remote server includes:
    providing fallback logic in the local gateway device; and
    enabling the fallback logic to locally control the local gateway device.

4. The method of claim 1 wherein temporarily removing the control of the local gateway device from the remote server includes:
    providing a peripheral device in the local gateway device;
    providing fallback logic in the peripheral device; and
    enabling the fallback logic in the peripheral device to control the local gateway device.

5. The method of claim 1 further comprising the remote server providing a notification of the failure in the remote server or in the communication link between the remote server and the local gateway device.

6. The method of claim 1 wherein temporarily removing the control of the local gateway device from the remote server includes:
    the local gateway device receiving input from the plurality of devices;
    caching the input during the failure in the remote server or in the communication link between the remote server and the local gateway device; and
    upon a reconnection between the remote server and the local gateway device, the local gateway device transmitting the input to the remote server.

7. The method of claim 1 further comprising:
    providing a secondary device with an internal processing unit; and
    enabling the internal processing unit to replace at least some functions executed by the remote server.

8. The method of claim 1 wherein temporarily removing the control of the local gateway device from the remote server includes enabling a differential data exchange between the remote server and the local gateway device.

9. The method of claim 8 wherein enabling the differential data exchange between the remote server and the local gateway device includes transmitting only changes in a state of the data between the remote server and the local gateway device.

10. The method of claim 1 wherein temporarily removing the control of the local gateway device from the remote server includes the local gateway device caching user interface input.

11. The method of claim 1 wherein temporarily removing the control of the local gateway device from the remote server includes:
    providing a backup communication path between the remote server and the local gateway device; and
    the remote server communicating with the local gateway device via the backup communication path.

12. The method of claim 11 wherein a first technology supports the communication link, wherein a second technology supports the backup communication path, and wherein the first technology is dissimilar from the second technology.

13. The method of claim 1 wherein temporarily removing the control of the local gateway device from the remote server includes:
    providing a backup of the remote server with a backup of the control logic, the backup of the control logic being a duplicate of the control logic for the local gateway device stored on the remote server; and
    enabling the backup of the control logic in the backup of the remote server to control the local gateway device.

14. A system comprising:
    a remote server;
    a local gateway device remotely located from the remote server;
    a plurality of devices coupled to the local gateway device; and
    a communication link connecting the remote server and the local gateway device,
    wherein the remote server controls the local gateway device by the remote server executing control logic of the local gateway device stored on the remote server,
    wherein the local gateway device manages data and settings for the plurality of devices in response to the remote server executing the control logic, and
    wherein, upon the local gateway device detecting a failure in the remote server or in the communication link, the local gateway device temporarily removes control of the local gateway device from the remote server.

15. The system of claim 14 wherein the local gateway device includes fallback logic, and wherein, upon the failure in the remote server or in the communication link, the local gateway device enables the fallback logic in the local gateway device to locally control the local gateway device.

16. The system of claim 14 further comprising a backup communication path connecting the remote server and the local gateway device, wherein, upon the failure in the remote server or in the communication link, the remote server communicates with the local gateway device via the backup communication path.

17. The system of claim 14 further comprising a backup of the remote server, wherein the backup of the remote server includes a backup of the control logic, the backup of the control logic being a duplicate of the control logic of the local gateway device stored on the remote server, and wherein, upon the failure in the remote server or in the communication link, the backup of the control logic is enabled to control the local gateway device.

* * * * *